United States Patent [19]
Toshikatsu et al.

[11] Patent Number: 5,539,491
[45] Date of Patent: Jul. 23, 1996

[54] BACK-DRIVEN TYPE AUTOFOCUS CAMERA

[75] Inventors: Atsuta Toshikatsu; Yamamoto Masaru; Koshimizu Yoshinori; Kitamura Nobuo, all of Tokyo, Japan

[73] Assignee: Kyocera Corporation, Kyoto, Japan

[21] Appl. No.: 257,066

[22] Filed: Jun. 9, 1994

Related U.S. Application Data

[63] Continuation-in-part of Ser. No. 226,004, Apr. 7, 1994.

[30] Foreign Application Priority Data

Jun. 15, 1993 [JP] Japan .................................. 5-143477
Oct. 12, 1993 [JP] Japan .................................. 5-254315

[51] Int. Cl.⁶ ...................................................... G03B 13/36
[52] U.S. Cl. .......................................... 354/400; 354/195.1
[58] Field of Search ................................ 354/400–409, 354/195.1, 195.11, 195.12

[56] References Cited

U.S. PATENT DOCUMENTS 4,241,987 12/1980 Goldberg ............................ 354/195.1
5,231,443 7/1993 Subbarao ............................ 354/400

FOREIGN PATENT DOCUMENTS 15-294734 10/1940 Japan .
2-24640 1/1990 Japan .
5-173225 7/1993 Japan .
6-51189 2/1994 Japan .
6-51190 2/1994 Japan .

*Primary Examiner*—Russell E. Adams
*Attorney, Agent, or Firm*—Loeb & Loeb

[57] ABSTRACT

The invention concerns a back-driven-type autofocus camera of a photographic lens-interchangeable type, which is capable of operating an autofocus function in any lens mounted on a lens mount directly or by means of an adapter ring. The back-driven-type autofocus camera includes a movable section having a film feeding and holding device, a range-finding element, and an optical system, and a fixed section having an outer case provided with a release button and a lens mount. The fixed section incorporates therein the movable section through a slider device so as to permit focusing-adjustment driving of the movable section in the direction of the optical axis of a photographic lens. The outer case with certain rigidity is arranged so as to separate the movable section from an external force.

8 Claims, 8 Drawing Sheets

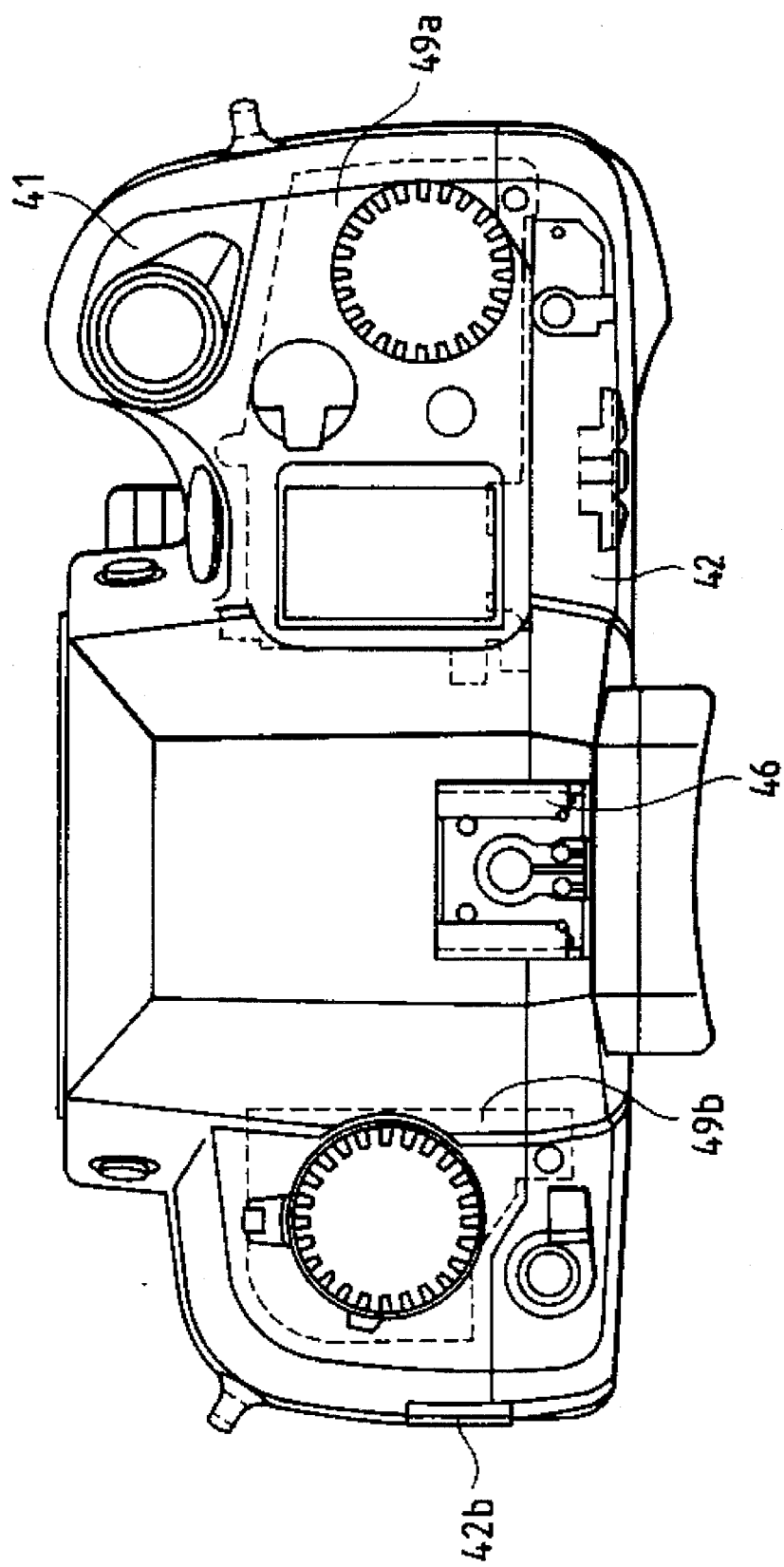

BACK-DRIVEN TYPE AUTOFOCUS CAMERA

CROSS-REFERENCE TO CO-PENDING U.S. APPLICATION

This is a continuation-in-part application of U.S. application Ser. No. 08/226,004 filed on Apr. 7, 1994.

BACKGROUND OF THE INVENTION a) Filed of the Invention

The present invention relates to a back-driven-type autofocus (hereafter referred to as AF) camera in which a body for holding a film is adapted to be driven to an in-focus position on the basis of an amount of offset with respect to a focal plane on which an image of a subject is to be formed.

b) Description of Related Art

Techniques which have hitherto been disclosed as the focusing driving mechanism for a camera using a film include three systems, i.e., a system in which an image plane portion (aperture frame) of a camera body is moved in the direction of the optical axis, a system in which two mirrors provided between a photographic lens and a film-plane receiving portion are moved, and a system in which the photographic lens is moved in the direction of the optical axis.

The first system is disclosed in Japanese Utility Model Registration No. 294734 which was formerly put to commercial use. In this system since only the film-plane receiving portion is moved, it is necessary to provide a loop to the film between the film-plane receiving portion and two spool shafts holding the film, and it is necessary to provide a large interval between image planes so as to prevent the overlapping of the photographed image planes. Partly due to this reason, this system is not used for cameras in which winding is controlled by perforations in the film as in 35-mm film cameras which are presently used most widely, since the interval between the image planes is defined at a small dimension. In addition, in view of the recent tendency of the photographic lenses toward a larger aperture, it is necessary to increase the vertical accuracy of the film receiving portion with respect to the optical axis of the photographic lens, and it is difficult for this first system to meet this requirement during the focusing driving.

The second system is disclosed in Japanese Utility Model Examined Publication No. 16339/1990. In this system, the mirrors disposed between the photographic lens and the image-forming plane are moved to effect focus adjustment. Since two mirrors are required, this system must overcome the noise factor that the deterioration of an image on the film surface becomes large in proportion to the parallelism of the two mirrors after being built in, and meet the requirements of parallelism between the lens mounting surface and the film surface (parallelism of the camera body) which is generally required for cameras, parallelism between the two mirrors of a mirror assembly, and parallelism between the mirror assembly and the body. As a result, the required accuracy is high as compared with the techniques used in ordinary cameras, which results in increased cost, so that this system has not been put to commercial use.

The third system is one in which the photographic lens is moved in the direction of the optical axis, and has been widely disseminated as the focusing driving system of cameras because of the above-noted deficiencies of the other first and second systems and due to economic effects and the like. Also, this system can be further subclassified into the following types of system: a system in which the photographic lens at a distal end of a bellows is moved forward by a rack and a pinion, and which is used in press cameras; a system in which a lens barrel is moved forward by means of a lever interlocked with a rotating cam, and which is used in twin lens reflex cameras; and a system in which the lens is moved forward by rotating a helicoid of a photographic lens barrel, and which is presently used most widely.

Here, a description will be given hereafter of the progress made in the development of AF single-lens reflex cameras of the type in which the helicoid of the photographic lens is rotated. Namely, because of the above-described technical background, in single-lens reflex cameras of a non-AF lens interchangeable type, control concerning the diaphragm has been mainly effected by means of a mechanical signal pin at an interface between the photographic lens and the camera body with a lens mount interposed therebetween. With first-generation AF single-lens reflex cameras, a development target was placed on the expansion of the lens system which is principally based on conventional non-AF lenses, and an AF lens was provided as a part of the line of interchangeable photographic lenses. Namely, this is a combination of an AF photographic lens which incorporates a power supply and a motor for focusing driving and in which a connector terminal for communication with an arithmetic circuit on the camera body side including a rangefinding element is added to the lens mount, and a an AF camera body which is equipped with the rangefinding element and the arithmetic circuit and in which connector contacts for communication with the lens are added to the body mount. If the non-AF lens is mounted on the above-described AF camera, a focus aid function in which the camera-side rangefinding function works in manual focusing could be achieved. However, the aforementioned first-generation AF single-lens reflex cameras did not find widespread use since the AF lenses were large and heavy.

With respect to the second- and third-generation AF single-lens reflex cameras which were developed next, a series of AF systems have been developed in which a power supply and a focusing driving mother are incorporated on the camera side, a ROM with data of the Lens written therein or a CPU is mounted on the photographic lens so as to communicate information with a camera-side CPU, and a lens-driving coupler for focusing is provided as an interface for a mount. These AF single-lens reflex cameras contributed to the expansion of photographing opportunities as fully automatic cameras due in part to the automation of other elements.

On the other hand, however, the non-AF photographic lenses to date can demonstrate only the function of the above-described focus aid even if they can be mounted on the second -and third-generation AF single-lens reflex cameras. In realizing the AF operation, in order to speedily effect the automatic focusing or automate a large number of functions, information on interchangeable lenses is formed as ROM data and a CPU is mounted, so as to communicate information with the camera body-side CPU. In the above-described second- and third-generation AF single-lens reflex cameras, a coupler, an information-communication connector terminal, and the like are added as an interface function of the mount, thereby developing the lens-mounting mount as a totally new system. It can be said that this is a result of the fact that priority is placed on a new AF system rather than on the interchangeability of new and old lenses (interchangeable lenses exclusively used for AF, and non-AF interchangeable lenses).

In addition, to further reduce the time from rangefinding till focusing in the above-described lens- interchangeable-type AF single-lens reflex cameras, it is necessary to reduce the mass of the driving elements including lens elements to be driven for focusing among the elements making up the photographic lens, and to reduce the coefficient of friction of the driving system. For this purpose, various measures are adopted such as the use of an aspherical lens for a part of the lens assembly to reduce the total number of lens elements used, the use of a plastic molding for a lens barrel to reduce the mass of members for focusing driving, and the provision of a substantial clearance to the helicoid to reduce the coefficient of friction. However, if the helicoid is provided with a clearance, an amount of positional offset of lens elements from the optical axis and a misalignment of some lenses or the entire group of lenses from the optical axis occur due to the difference in the attitude of the camera. In particular, if the aspherical lenses are used, peripheral blurring and the deterioration of image performance such as MTF become noticeable due to the misalignment of the optical axis.

The performance of the photographic lens including the lens barrel has been developed by precision technology over a long period of years. This being the case, however, the provision of a clearance to the helicoid to reduce the focusing time resulted in harmful defects, i.e., the deterioration of image performance on the film surface and the offset of the focal plane. If the concept of the optical design for obtaining high-quality image performance is viewed in the light of the AF camera technology as a whole, the results have not been sufficiently satisfactory.

Moreover, the above-described second- and third-generation lens-interchangeable-type AF single-lens reflex cameras had problems is a camera system before the above-described techniques. That is, although it depends on the way the interchangeable lenses are chosen, interchangeable lens groups are generally more expensive than the cameras. If an AF single-lens reflex camera is to be used, non-AF interchangeable lens groups cannot be used at all if the focus aid is deteriorated. The camera users are denied the non-AF interchangeable lens systems which they purchased before, so that the users are compelled to replace the non-AF lens systems newly with AF interchangeable lens systems, or separately restructure the AF interchangeable lens systems, thereby imposing substantial economic sacrifices upon the users. If the progress of the development of camera technologies to date is viewed, the interchangeable function of lenses remains practically unchanged, and the unreasonableness concerning the above-described lens systems is caused from the fact that the lens systems are changed on the basis of a viewpoint centered around the camera body by being bewildered by the phrase of the interchangeable lens.

Ten-odd years have elapsed since the marketing of the above-described AF single-lens reflex camera systems. These AF single-lens reflex camera systems have received appraisal on their own merits and found widespread use, but the above-described problems remain unresolved. The technologies concerning the helicoid mechanism of the lens barrel have been developed over a long period to operate the helicoid mechanism smoothly without play and increase the economic efficiency by placing the lenses on the optical axis in the upright position. Japanese Patent Unexamined Publication No. 130007/1982 discloses a method in which sliding friction is converted to rolling friction while using a precision helicoid so as to reduce the coefficient of friction for focusing driving. With this method, however, since the surface hardness of the helicoid is increased, and steel balls are placed on the entire periphery, the cost becomes very high, and the total cost becomes enormous to implement a totally AF interchangeable lens. Hence, this method has not been put to commercial use.

For this reason, the aforementioned non-AF lens-interchangeable-type single-lens reflex cameras coexist with the AF single-lens reflex cameras without being weeded out. When systems for single-lens reflex cameras are considered, it is thought that various cameras can be developed centering on interchangeable lens groups. Namely, it is natural to use interchangeable bodies.

SUMMARY OF THE INVENTION

The present invention has been devised in line with this purport, and its objective lies in providing a system applicable to a lens-interchangeable-type AF single-lens reflex camera, which makes it possible to use a conventional non-AF interchangeable lens as it is. The system in accordance with the present invention can be said to be an interchangeable body-type system centering on interchangeable lens groups. This is so intended to allow the camera user to expand and structure the system of the single-lens reflex camera with ease without imposing an economic burden on the camera user. Another objective of the invention is to provide a system which can also be utilized to constitute a fixed-lens type AF camera or a lens-interchangeable type rangefinder or compact camera.

To attain the above-noted and other objectives, the present inventor proposes a novel system of focusing and driving a camera. The system of the present invention has proposed in U.S. application No. 08/226,004, and corresponds to the fourth system among the above-described focusing and driving systems. That is, an AF focusing and driving mechanism is provided on the camera body side, and in AF driving for focusing, a film-plane receiving portion holding a film is entirely driven to an appropriate focal plane on which an image of a subject is to be formed. Namely, the system of the present invention is characterized in that the focusing is effected by changing the distance of the film surface with respect to the photographic lens by moving the camera body holding a film with a film feeding and holding mechanism while leaving the photographic lens-moving mechanism as it is.

In an AF camera equipped with this system, the camera body is divided into a movable section (e.g. a body core) and a fixed section (e.g. an outer casing). It is preferable that the movable section is enclosed by the fixed section. A mount for mounting the photographic lens, other external operating members and the like are provided on the fixed section which is adapted to be held by user's hand. Furthermore, the movable section and the fixed section are coupled to each other by means of a precision slider device, so as to permit speedy control of the driving of the movable section in the direction of the optical axis of the photographic lens by the use of a motor. The camera with this system can solve the problems described in connection with the conventional systems, and maintain the excellence of the image performance of the conventional non-AF photographic lens.

In addition, since it is advantageous in controlling the driving if the mass of components of the body to be driven for focusing is made as small as possible, only a necessary minimum of functional elements are mounted on the movable section, and materials of the component parts are made of those having as small specific gravity as possible. The other o functional elements are provided on the fixed section, and the two sections are provided with circuit mounting organically by the use of a flexible printed circuit board (hereafter referred to as an FPC) and the like.

BRIEF DESCRIPTION OF THE DRAWINGS

In the accompanying drawings:

FIG. 8 is a top appearance view of the back-driven-type AF single-lens reflex camera when the photographic lens is removed in accordance with the first embodiment of the present invention.

DETAILED DESCRIPTION OF THE PREFERRED EMBODIMENTS

Figure 1:
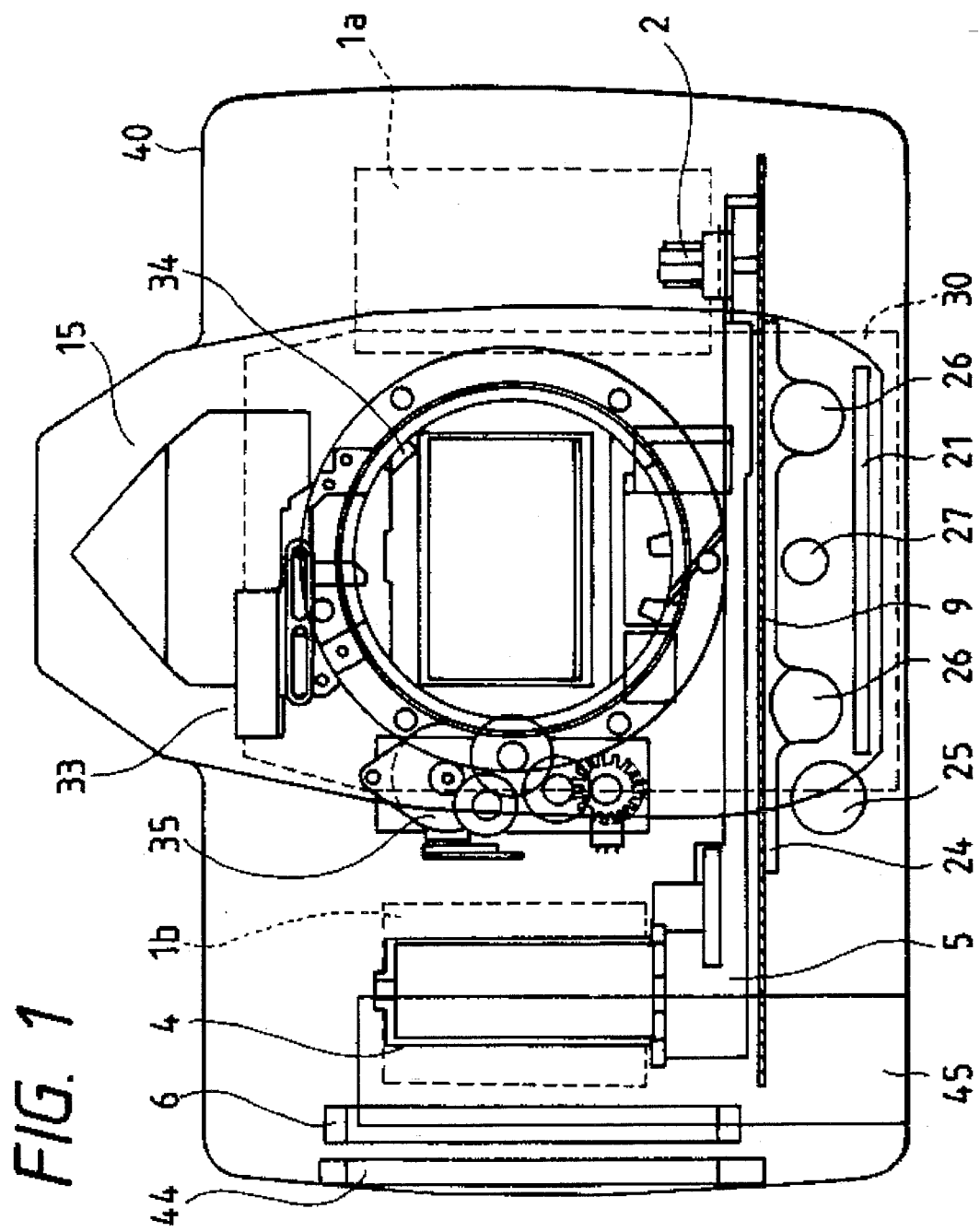
FIG. 1 is a schematic front elevational view of a back-driven-type AF single-lens reflex camera with a photographic lens removed in accordance with an embodiment of the present invention.

Referring now to the drawings, a detailed description will be given of the embodiments of the present invention.

Figure 2:
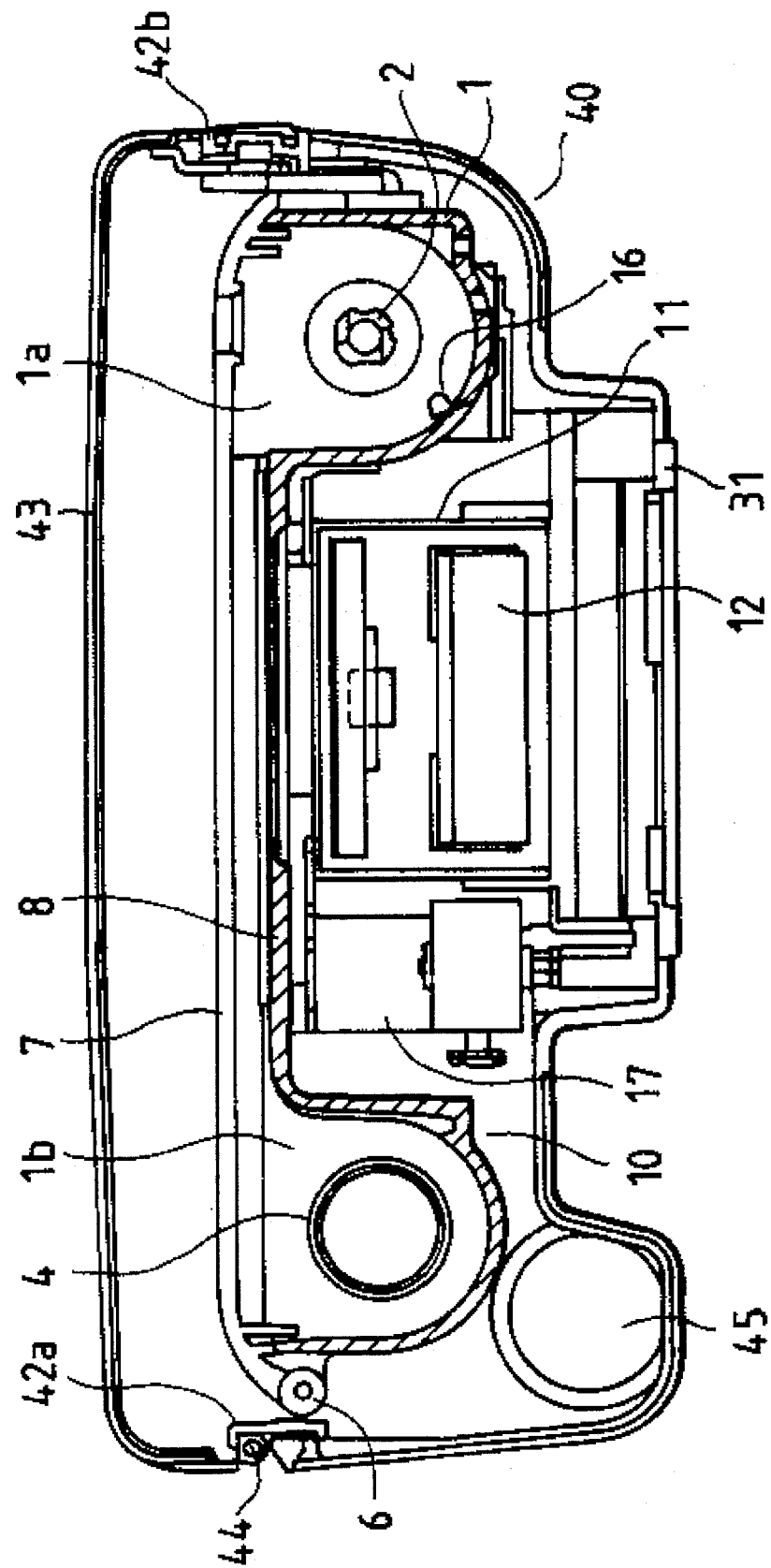
FIG. 2 is a schematic horizontal cross-sectional view taken along the position of the optical axis of the AF single-lens reflex camera in accordance with the present invention.
Figure 3:
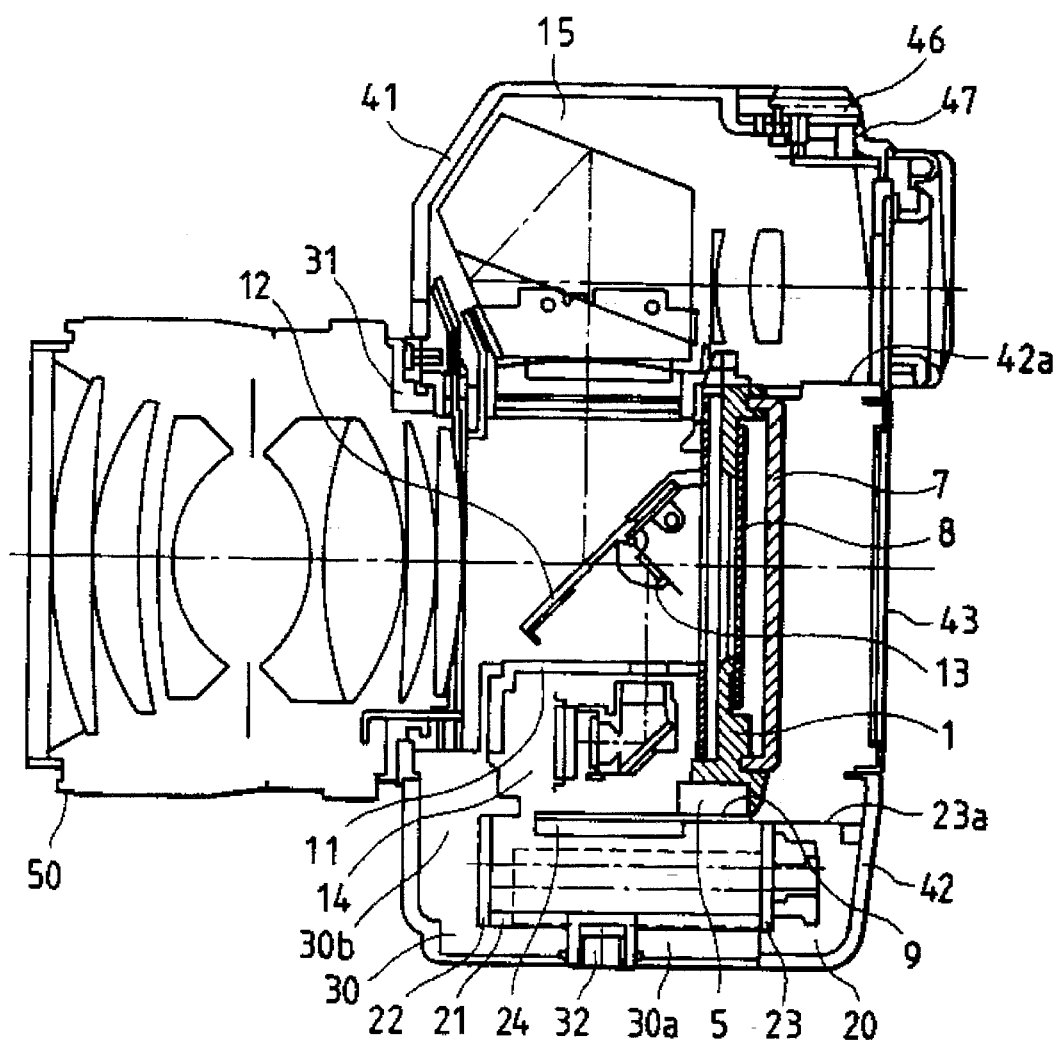
FIG. 3 is a schematic vertical cross-sectional view taken along the position of the optical axis in a state in which an interchangeable lens is mounted on the AF single-lens reflex camera in accordance with the present invention, and a focus ring of the interchangeable lens and a photographing position on the body core side are set to infinity.
Figure 4:
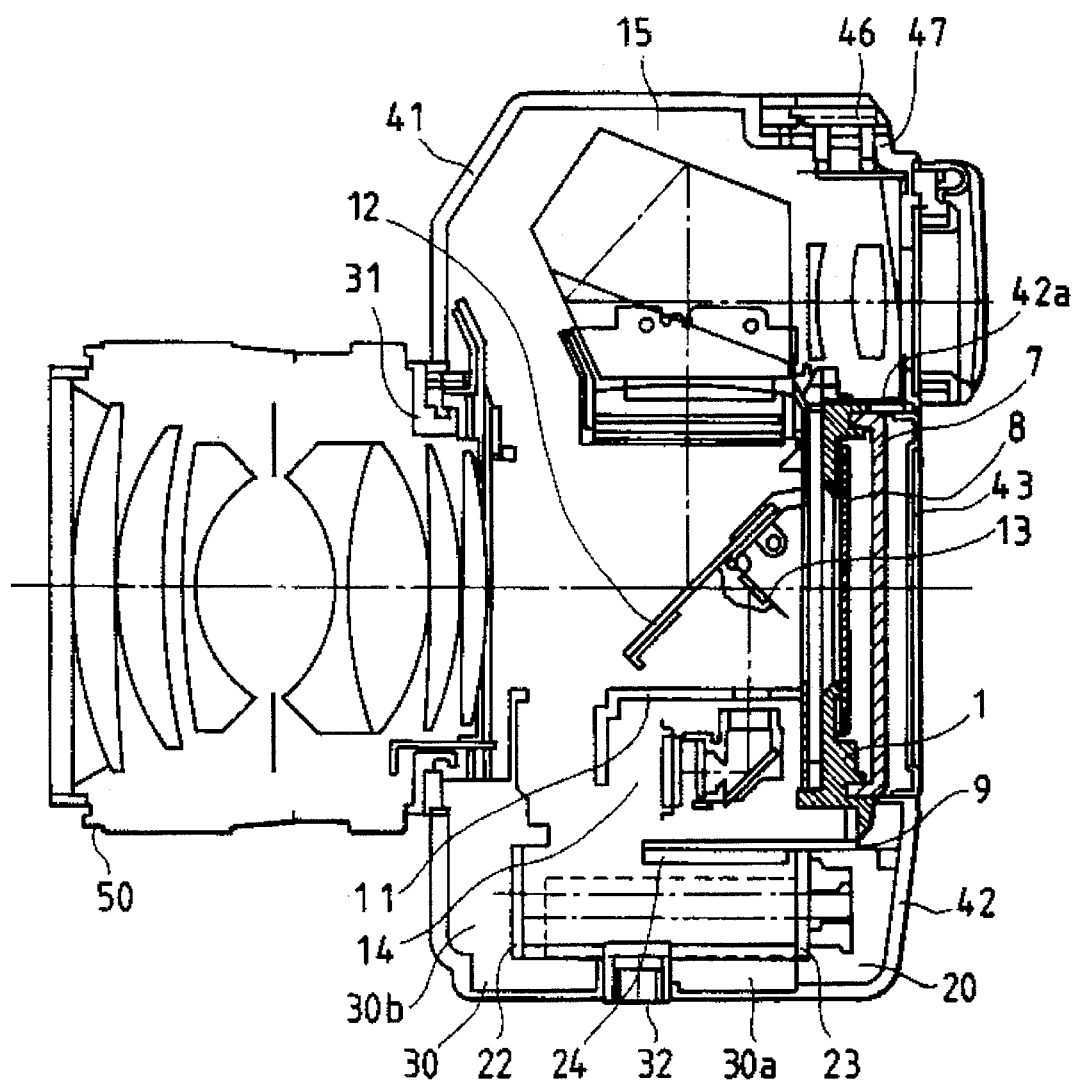
FIG. 4 is a schematic vertical cross-sectional view when the photographing position on the body core side is at nearest end in FIG. 3.
Figure 5:
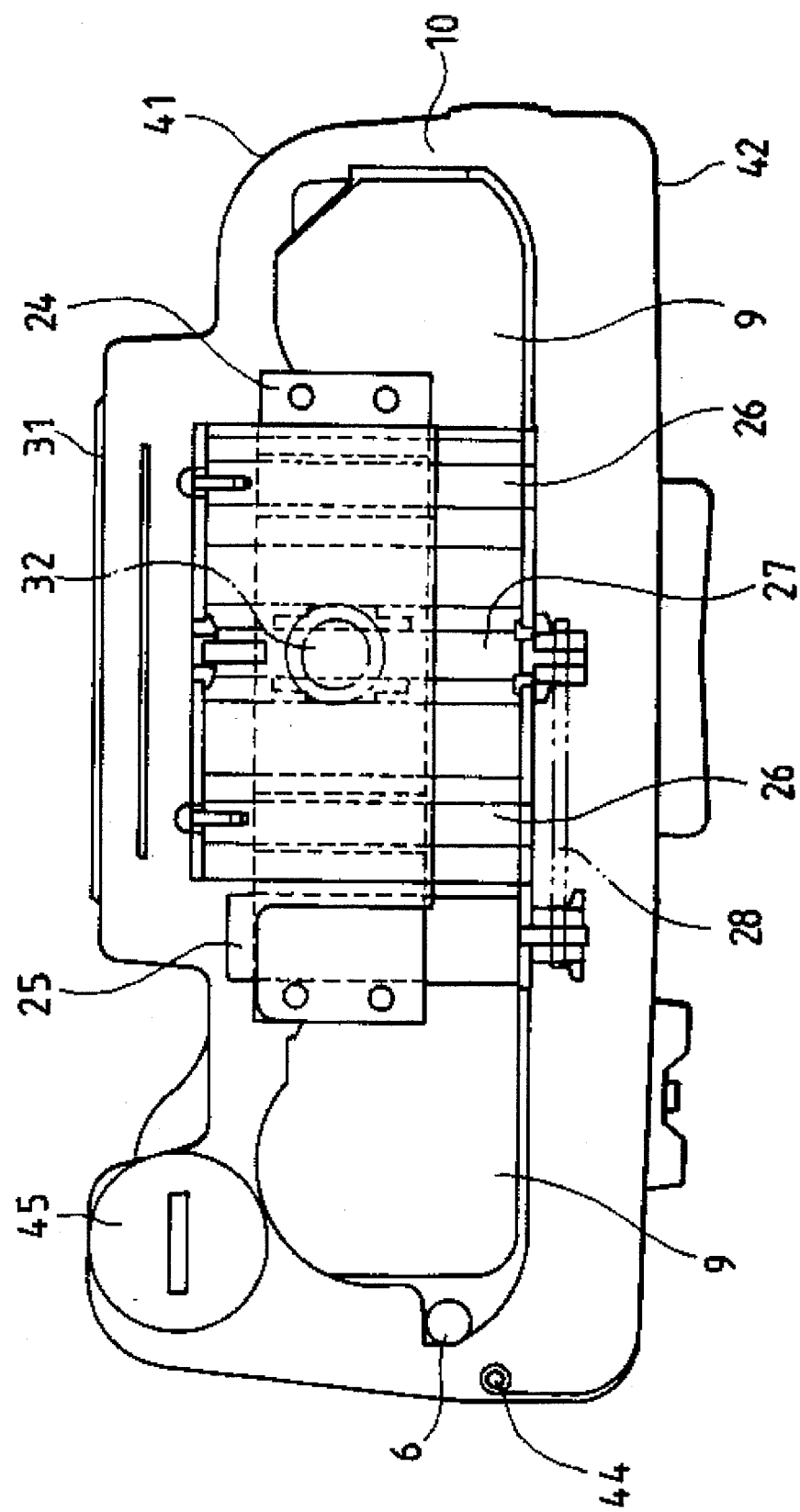
FIG. 5 is a bottom view of the AF single-lens reflex camera in accordance with the present invention and is a schematic view when the photographing position of the body core is at infinity.
Figure 6:
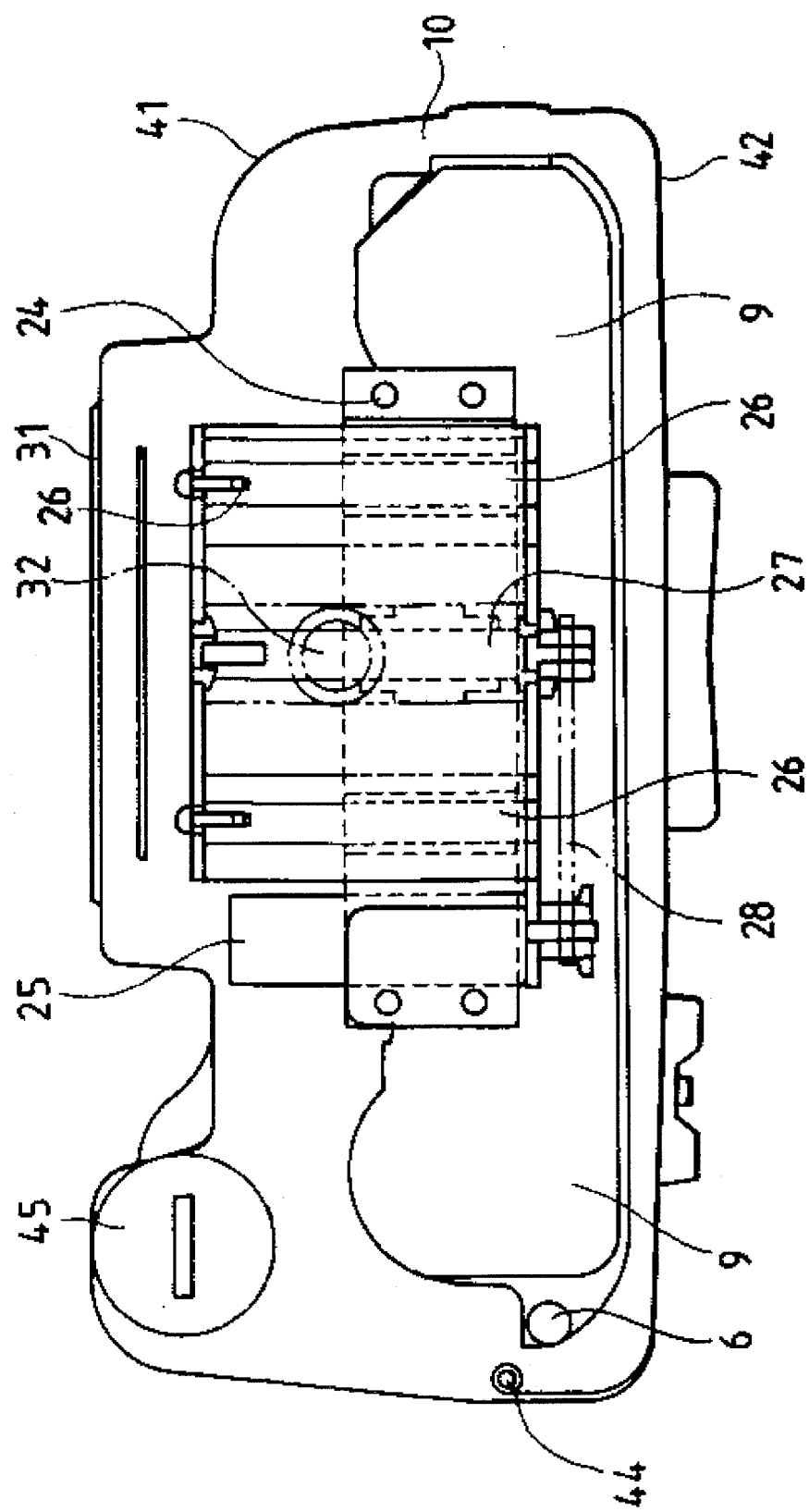
FIG. 6 is a schematic view of a bottom when the photographing position of the body core is at nearest end in FIG. 5.

FIG. 1 is a schematic front elevational view illustrating a configuration of an AF single-lens reflex camera with a lens removed in accordance with an embodiment of the present invention. FIG. 2 is a schematic horizontal cross-sectional view taken along the position of the optical axis shown in FIG. 1. FIG. 3 is a schematic vertical cross-sectional view taken along the position of the optical axis shown in FIG. 1 in a state in which a focus ring of the lens is set to infinity and the photographing position on the body core side is also set to infinity. FIG. 4 is a diagram of a state in which the photographing position on the body core side is at nearest end in FIG. 3. FIG. 5 is a bottom view of FIG. 1 and is a diagram of a state in which the photographing position of the body core is at infinity. FIG. 6 is a diagram of a state in which the photographing position of the body core is at nearest end.

Referring to FIGS. 1, 2, 3, and 5, a description will be given of a main configuration of the present invention by citing an example of an AF single-lens reflex camera in accordance with the embodiment.

First, a description will be given of various units constituting a body core 10 of the AF single-lens reflex camera. A main body 1 is comprised of a film cartridge chamber 1a having rewind pawls 2 on the right-hand side, a spool chamber 1b having a spool 4 on the left-hand side, and a film guide rail portion which connects the film cartridge chamber 1a and the spool chamber 1b and includes an image plane. An inner cover 7 which is pivotally retained by a hinge shaft 6 is disposed on a rear surface of the main body 1, and is locked by a locking device provided on a side surface opposite from the hinge shaft. The inner cover 7 is provided with a pressure plate 8 urged by a spring, guide rollers, and the like. An automatic winding and rewinding mechanism for the film is constituted by a motor incorporated in the shaft portion of the spool 4 of the spool chamber 1b and the rewind pawls 2 of the film cartridge chamber 1a connected to the motor via a reducing gear train 5. In this embodiment, perforations in the film are counted by a photo-reflector instead of a sprocket to control the amount of film to be fed, to thereby reduce the transverse width of the camera. In addition, a DX probe 16 for automatically setting the film sensitivity is screwed to a front portion of the film cartridge chamber 1a.

A focal plane shutter 17 and a mirror box unit 11 are screwed in front of the film guide rail portion positioned in a substantially central portion of the main body 1. A half mirror 12 and a total reflection mirror 13 are built integrally in the mirror box unit 11. The mirror box unit 11 further includes a rangefinding module 14 at a bottom portion thereof, and an optical system 15 constituting a viewfinder made by a Fresnel lens, a condenser lens, a pentaprism, and an eyepiece. It goes without saying the half mirror 12 and the total reflection mirror 13 undergo a quick return operation in a release sequence. In addition, a base plate 9 whose flatness is enhanced with strength improved by hardening is screwed onto the bottom portion of the assembly of the above-described main body 1, the base plate 9 also serving as a light-shielding member. This assembly will be referred to as a body core. The aforementioned members are the main components of the body core 10. However, since the body core 10 moves during autofocus driving as described before, control of driving is facilitated if the mass is minimized. Therefore, it is preferable that the components of the body core 10 are reduced in number and are made lightweight.

Next, a description will be given of a slider device 20. The slider device 20 of this embodiment is constructed as a united assembly. The assembly includes: an upper plate 24 having linear ball bearings at transversely separate two portions thereof, which functions as a part of linear guide, a pair of guide shafts 26 which receive respective linear ball bearings of the upper plate 24 and which are axially supported by front and rear support plates 22 and 23 connected through a lower plate 21; a nut fixed at a substantially central portion of the upper plate 24, i.e. between the linear ball bearings; and a screw 27 which threadingly engages with the nut of the upper plate 24 and rotatably supported by the front and rear support plates 22 and 23. A geared motor 25 is securely attached to the rear surface of the assembly, i.e. the rear support plate 23. Toothed pulleys are secured to the motor 25 and the screw 27 on the rear surface of this assembly. A timing belt 28 is suspended between these two pulleys. A drive controlling encoder, though not shown, is built in at a gear of the pulley secured to the screw 27 via a reducing gear train. As the encoder is added, it becomes possible to control the fine driving of the upper plate 24 of the slider mechanism 20 in the direction of the guide shaft 26.

Next, a description will be given of a mount base 30, i.e., a support member having an L-shaped side configuration. Provided on a vertical surface 30b of the mount base 30 are an open f-value input device 33 which is an input/output mechanism for a diaphragm of a photographic lens 50, a preset aperture-value input device 34, an aperture controlling device 35, a lens mount 31, a lens-mounting stopping device, a canceling button for the stopping device, a preview button, and the like. The horizontal surface of a bottom 30a secures a flat surface for mounting the slider device 20 thereon, and is provided with a plurality of screwing counterbores and tapped holes for attaching an outer front case 41 and an outer rear case 42 thereto. Furthermore, the bottom 30a is also provided with a tripod-attaching nut 32. The securing of perpendicularity of the surfaces to which the lens mount 31 and the slider device 20 are respectively mounted is very important, so that an unillustrated angle (reinforcing member) and the like are provided between the vertical surface 30b and the bottom 30a. Furthermore, consideration is paid to the maintenance of the perpendicularity of the mount base 30 by dispersing an unexpected impact load applied to a projecting portion such as the photographic lens by screwing the outer front case 41 and the outer rear case 42 onto the mount base 30 while being kept in abutment against each other.

An outer case 40 is comprised of the outer front case 41 and the outer rear case 42 which are split into the front and rear sides in the direction of the optical axis. The outer front case 41 has at least an unillustrated release button and a battery chamber 45. The outer rear case 42 is formed with a rectangular hole for a back cover 43, and has on its inner side a projecting portion 42a projecting inwardly from a rear surface of the case 42 by a relatively large length along an upper edge of the rectangular hole, while a relatively short projecting piece is provided below a lower edge of the rectangular hole in a range in which it does not come into contact with the rear surface of the main body 1, so as to improve the strength of the outer rear case 42. Further, the back cover 43 is pivotally secured to the rear surface by means of a hinge shaft 44, and is locked by an unillustrated locking device on the side surface opposite from the hinge shaft. In addition to these members, an external operating member, an LCD display panel, an accessory mounting eye, and the like are provided across the dividing line of the outer case 40. The inner configuration of the outer case 40 are designed so as not to hinder the focusing driving of the body core 10.

Next, a description will be given of the building in of the above-described units.

The upper plate 24 of the slider device 20 is screwed onto the base plate 9 in such a manner that the direction of the optical axis of the body core 10 and the direction of the guide shaft 26 of the slider device 20 which is mounted on the base plate 9 will be aligned. The bottom 30a of the mount base 30 is screwed onto the lower plate 21 integrated with the body core. A projecting piece 23a is attached to the supporting rear plate 23 of the slider device 20 in such a manner as to extend along the outer rear case 42 so as to improve the aesthetic appearance, as will be described later. It should be noted that the projecting piece 23a may be provided on the outer rear case 42.

Next, the outer case 40 is screwed onto the mount base 30 and the like so that assemblies of the body core 10, the slider device 20, and the mount base 30 are incorporated therein. Referring to FIGS. 2, 3, and 8, a detailed description will be given of the joining of this outer case 40.

In the left-hand portion of FIG. 2, the back cover 43 together with the hinge shaft 44 is screwed onto the left-hand surface 42a, while a lock for the back cover 43 as well as cover-opening devices for the inner cover 7 and the back cover 43 are incorporated on a right-hand surface 42b on the opposite side. As shown in FIG. 3, the outer rear case 42 with an accessory mounting seat 46 screwed thereto together with a reinforcing plate 47 is screwed at its bottom onto the slider device 20. At this time, the locking and opening of the aforementioned two covers are checked.

Next, the outer front case 41 is screwed onto the vertical surface 30a and the bottom 30b of the mount base 30, and is further screwed into tapped holes in a receiving plate portion of the hinge shaft 44 at its left-hand surface, and, at its right-hand surface, directly onto the outer rear case 42 on this side of the locking device at a flank thereof or onto tapped portions of a reinforcing plate, as illustrated. Next, as shown in FIG. 8, at its upper portion, a base plate 49a of the LCD display panel, a receiving plate 49b of an operation dial, the reinforcing plate 47 of the accessory mounting portion are selectively screwed, as required, for the purpose of maintaining rigidity. At the time of screwing this outer front case, screwing is effected by causing the outer case 40 to be brought into contact with the outer front case, as described above. To prevent heads of the aforementioned setscrews from being exposed appearance-side, leather is attached to these portions, or these portions are concealed by other appearance parts. By virtue of the above-described joining arrangement for the outer case 40, it is possible to adopt a plastic molding so as to enhance the degree of freedom in the design of the outer case 40 and lower the cost.

Finally, wiring is carried out for electrical circuits, as required, at the time of incorporating the various units.

As can be appreciated from FIG. 3, the projecting portion 42a of the outer rear case and the projecting piece 23a in the rear of the slider device are provided so as to improve the appearance at portions above and below the inner cover 7 as seen from the rear of the camera and to prevent leakage of light when the back cover 43 is opened. Furthermore, a foamed resilient member is attached to a lower portion of a tip of the projecting piece 23a so as to prevent the leakage of light by being pressure fitted to the rear surface of the outer rear case 42.

Referring mainly to FIG. 3, a description will be given of the focusing driving of the AF single-lens reflex camera of the present invention which is assembled as described above.

In the AF single-lens reflex camera having the above-described configuration, upon pressing the release button, a bundle of rays transmitted through the photographic lens 50 is caused to be transmitted through the first half mirror 12 for the viewfinder, and is led to the rangefinding module 14 by the second total reflection mirror 13 provided in the rear. An amount of positional offset of the body core 10 with respect to the optimum focal plane on which an image of the subject is to be formed is detected by the rangefinding arithmetic circuit, and the driving of the body core 10 is controlled by this amount of offset by the motor driving controlling circuit. Namely, the geared motor 25 is rotated in a predetermined direction to rotate the screw 27 by means of the timing belt 28, which in turn drives; the upper plate 24 in the direction of the optical axis by means of the nut, thereby moving the body 10 by the aforementioned amount of offset. Subsequently, after completing exposure through a series of sequence operations, the film is advanced.

By comparing FIGS. 4 and 6 with FIGS. 3 and 5, the operation within the outer case 40 by the focusing driving will be explained. It is the body core 10 holding the film and the upper plate 24 of the slider device 20 that operate in the direction of the optical axis. Fixed are a driving mechanism including the lower plate 21 of the slider device 20, the motor 25, the guide shaft 26, the screw 27, and the like, as well as the mount base 30, the outer front case 41, the outer rear case 42, the back cover 43, the photographic lens 50, and the like. The focusing driving of the body 10 produces a result which is equivalent to the moving forward of the entire group of the photographic lens elements 50.

Because of this operating principle, even when the photographic lens is a zoom lens, it is unnecessary to incorporate correction values and to transmit lend data to the camera side. Therefore, no problem is presented in operating the AF single-lens reflex camera of the present invention by using a non-AF lens. The conventional AF single-lens reflex camera of the above-described second- or third-generation lens-driving system, to which a zoom lens is mounted on it, requires specific correction data to be written in the lens-side ROM since the amount of offset in the rangefinding module 14 and the amount of the lens being moved forward are not equal. Furthermore, the conventional AF single-lens reflex camera of the above-described second- or third-generation lens-driving system requires data written in the lens ROM of each photographic lens indicative of the amount of focusing driving per revolution of the coupler since the amount of the lens being moved forward per revolution of the coupler differs for each photographic lens. Thus, the lens ROM is indispensable to interchangeable lens for second- and third-generation AF single-lens reflex cameras, although there may be a difference in the amount of data. However, as noted above, the focusing driving system of the present invention can operate without specific data of the photographic lens interchanged one another.

Advantages of the AF single-lens reflex camera of the first embodiment over the second- and third-generation AF single-lens reflex cameras will be described below. Namely, the following are built into the body of the camera as an integral arrangement: a film holding element including a conventional back cover (corresponding to an inner cover in the present invention) and a locking device therefor, a DX probe for automatically setting a film sensitivity, a film winding and rewinding mechanism, a focal plane shutter, a mirror box unit including a quick return mechanism for a mirror, a viewfinder device, rangefinding and metering devices, and the like. This integral unit is referred to as a body core. A motor-driven precision slider device is mounted at a lower portion of the body core. In addition, the slider device is fixed to a mount base which is a supporting member having an L-shaped cross section and which is provided with a mount for mounting the photographic lens, a mechanical signal pin with respect to the lens, an I/O control mechanism for interfacing (preset aperture values, open f-values of lenses, aperture control, lens positioning, etc.). Furthermore, the body core and the slider device are accommodated in the outer case which is provided with a battery-accommodating chamber, an external operating dial and the like, an LCD display panel, an accessory mounting seat, a back cover (in the present invention, two covers including the aforementioned inner cover and the back cover are provided), a locking device for the back cover. The outer case is screwed onto the L-shaped mount base and the outer cases to secure the rigidity of the outer case and to allow the body core to be driven inside the outer case. At the same time, as many camera component elements as possible are mounted on the fixed side to reduce the mass of the body core elements.

An amount of focus offset is detected from a bundle of rays transmitted through the photographic lens by means of a rangefinding element and its arithmetic circuit, and the driving of the body core is controlled onto the focal plane on which an image of the subject is to be formed by means of the slider device including the motor. The mass of the body core is made as small as possible to reduce the driving control time and improve stopping-position accuracy and not to cause impediments in its operation. At the same time, an arrangement is provided such that the body core is included in the outer case so as not to be affected by an external force. Furthermore, to reduce the mass of the body core, as for the main body of the camera, which is a supporting member for the body core, peripheral portions of the image plane including the film rail surface are formed of a press component of a light alloy, while the other supporting components are formed of a plastic-molded hybrid component. In addition, the other components constituting the body core are formed of components having as small specific gravity as possible.

The two covers, i.e., the inner cover and the back cover, are arranged to be at least jointly operable to facilitate the loading and unloading of the film.

In the mounting of electrical circuits, the component elements of the body core on the movable side and the component elements of the outer case on the fixed side are connected by means of the FPC or the like, and the FPC is provided with leeway so as not to apply a load to driving when the body core is driven in the direction of the optical axis, and the FPC is provided in such a manner as to meander in an S-shape. A linking mechanism for the two covers and a diopter adjusting mechanism of the viewfinder are arranged in such a manner as not to constitute a load on controlling the driving of the body core.

With the above-described second- and third-generation AF single-lens reflex cameras of the lens-driving type, when a zoom lens is mounted, the amount of offset in the rangefinding element and the amount of the lens being moved forward are not equal during focusing driving, it is necessary to convert the amount of driving by writing specific correction data in a lens-side ROM. With the AF single-lens reflex camera of the present invention having the above-described configuration, however, the amount of offset of the body core on the optical axis with respect to the focal plane on which an image of the subject is formed is detected, and the driving of the body core is controlled by this amount of offset. This, when put differently, is equivalent to the forward movement of the entire group of the photographic lens elements. By virtue of this rangefinding and driving principle, even when a zoom lens is used, it is unnecessary to use a correction value such as the one mentioned above, and no problem is presented if an AF system is incorporated by using a conventional non-AF lens.

In addition, the amount of the body core driven is finite, and since the driving of the body core is equivalent to moving the entire group of the photographic lens elements, in the case of long-focal-length lenses having large amounts of forward movement among a group of interchangeable lenses ranging from a wide angle lens to a telephoto lens, amounts of forward movement from infinity to nearest end are large. Hence, there are cases where the situation cannot be coped with by the amount of driving on the body core side alone. Even in such a situation, however, if the range ring of the photographic lens is operated and set to a certain finite position, focusing driving becomes possible from that set position to the nearest side. The back-driving system of the present invention has an advantage in that when a long-focal-length lens is used, although the amount of the camera core being moved forward is lacking, not only is it possible to make up for the lack by operating the range ring on the lens side, but also a closer shot is possible which is otherwise unobtainable from the amount of the lens moved forward. Here, the amount of driving in which the amount of the photographic lens moved forward and the amount of the body core driven are added together is equivalent to the entire amount of driving for focusing, so that a substantially close shot becomes possible.

If the body core is moved in the outer case in the direction of the optical axis, the camera inevitably becomes large. In the embodiments, therefore, a method of controlling the amount of film being fed is adopted by counting perforations in the film by a photo-reflector instead of a sprocket, so as to reduce the transverse width of the camera.

When the back cover is opened in a state in which the body core is not at the position of nearest end, the appearance of portions of the body core above and below the inner cover is deteriorated. To obviate this and prevent leakage of light from the camera back, a projection is provided at a position above the back cover along the inner rear surface of the outer rear case, while a portion of the slider device is provided with a projecting piece at a position below the back cover along the inner rear surface of the outer rear case at a lower portion thereof. This eliminates the need to cover the body with a separate case, leading to a reduction in cost.

Although the present invention is described in connection with the single-lens reflex camera illustrated in the foregoing embodiment, the present invention is applicable to lens-interchangeable-type cameras in general. Namely, a description will be given hereafter of a second embodiment with reference to FIG. 7.

Figure 7:
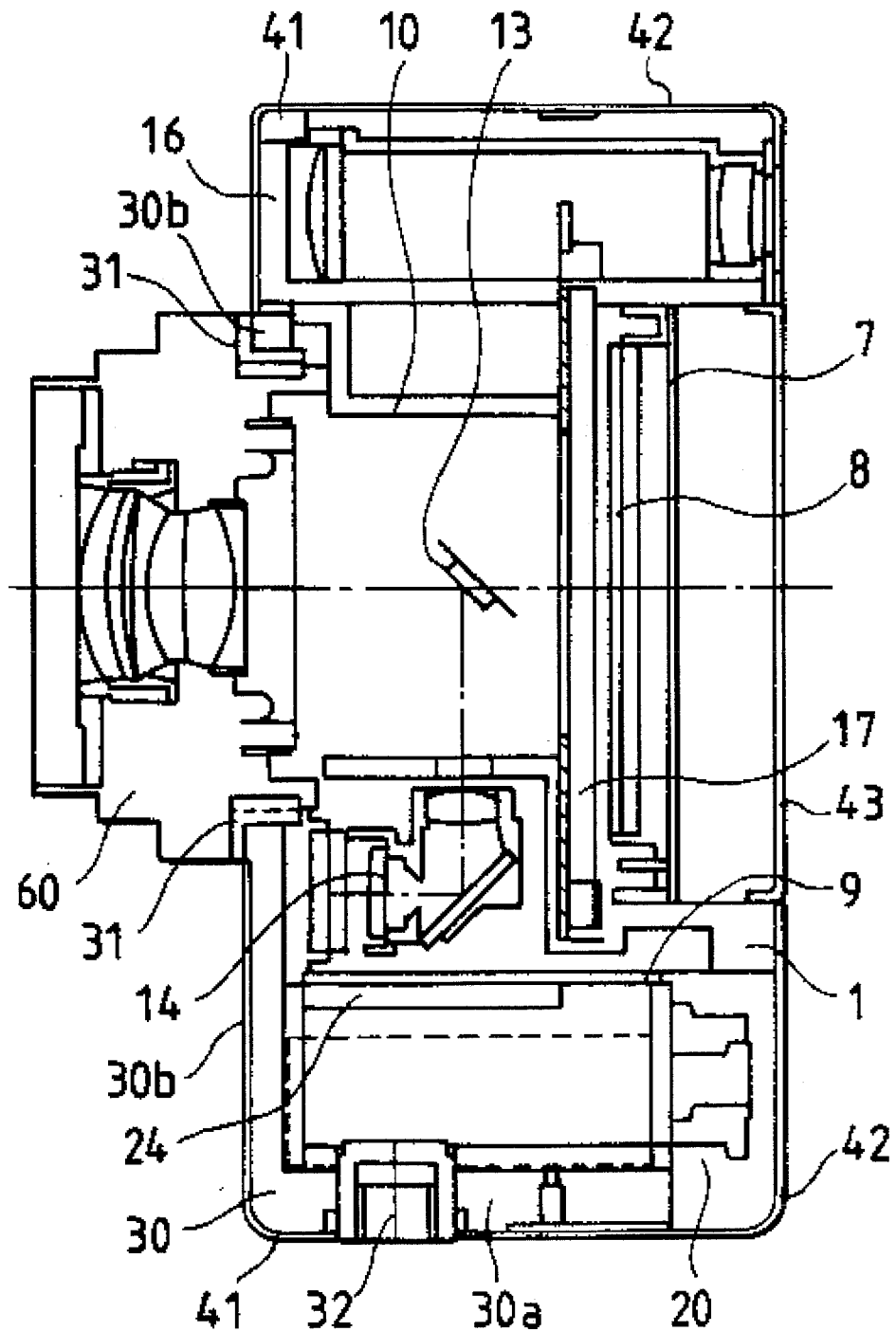
FIG. 7 is a schematic vertical cross-sectional view, taken along the position of the optical axis, of an AF camera when a photographic lens and a photographing position of the body core side are set to infinity in accordance with another embodiment of the present invention.

FIG. 7 is a vertical cross-sectional view taken along the optical axis of a camera adopting the AF system by applying the present invention to a rangefinder, i.e., an interlocking rangefinder-type camera. Of the elements constituting the camera, those portions that are identical to those of the AF single-lens reflex camera in accordance with the first embodiment will be denoted by the same reference numerals, a description thereof will be omitted, and only differences with the first embodiment will be described. Namely, the basic configuration including the body core 10, the slider device 20, the outer front case 41, and the outer rear case 42 is identical. Unlike a interlocking rangefinder's viewfinder, in the second embodiment, rangefinding is effected on the camera body side, so that it is unnecessary to cause the two images in the viewfinder to coincide as a range ring on the lens is rotated. Preferably, an arrangement may be provided such that by adopting a zoom viewfinder, and an interchangeable lens is mounted to allow the position of the optical system of the viewfinder to be changed, and a change of the multiplication of a viewfinder image is effected in correspondence with the focal length of a photographic lens 60, the zoom finder being affixed on the fixing side.

The bundle of rays transmitted through the photographic lens 60 is led to the rangefinding module 14 located at the bottom of the camera body 1 by the total reflection mirror 13 facing the optical axis in front of the focal plane shutter 17. The total reflection mirror 13 undergoes a quick return in the series of operations including exposure and film advance upon release. The viewfinder 16 is affixed to the outer case 40, and is separated from the body core 10. Since the focusing driving is basically the same, a description thereof will be omitted.

As described alcove, the present invention is readily applicable not only to a single-lens reflex camera but also to a lens-interchangeable camera.

As described above, in accordance with the arrangement of the present invention, the following outstanding advantages are provided. Namely, AF photographing is possible even in the case of a manual focusing lens (a non-AF lens) having a focusing mechanism employing a conventional helicoid which is finished for precision screw-meshing by lapping and to which grease of appropriate viscosity is applied to provide no clearance or clattering, or in the case of a non-focusing lens using only a bellows with no forward moving mechanism insofar as such a lens can be mounted on the camera embodying the present invention by means of an adapter ring. In addition, the present invention is readily applicable not only to single-lens reflex cameras but also to lens-interchangeable cameras.

During focusing driving, since only the size and the weight of the body core are related irrespective of the size and the weight of the photographic lens, the driving torque required for the slider device is fixed. In addition, in case where the body core is encapsulated by the outer casing as in the embodiments of the present invention, a user's hand holding the camera or the like is not brought into contact with the elements which are driven for focusing, so that an unnecessary load is prevented from being applied to the slider device. Hence, it is readily possible to adopt a clearance-free smoothly-operating arrangement as the fine-driving controlling mechanism of the slider device. In addition, since it suffices to provide the slider device on the camera body side only, the total cost can be lowered when the focusing driving apparatus is considered as the camera system.

Even in a case where a zoom lens is mounted, in which the amount of offset from the image forming position detected in the camera body site is not coincident with the focusing amount required in the Lens side in the conventional AF single-lens reflex camera of the second- or third-generation lens-driving system, the back-driven type system of the present invention can achieve the auto-focusing by exclusively driving the body core the amount of offset detected by the rangefinding module and the rangefinding arithmetic circuit since the back-driven-type auto-focusing operation of the present invention is equivalent to the forward movement of the entire group of lens elements. Further, during focusing driving, there is no need to take into consideration the difference in the amount of the lens being moved forward per revolution of the coupler since there is no interface between the camera body and the photographic lens.

For the reasons stated above, lens ROMs incorporated in photographic lenses as in the second- and third-generation AF cameras are not required. Accordingly, no impediments are caused in the adoption of AF by the use of conventional non-AF interchangeable lenses.

Furthermore, if the amount of the body core being driven is made large, the depth of the camera becomes large, so that it is necessary to restrict the amount of driving. There are cases where the amount of driving becomes smaller than the amount of forward movement of some lenses in the group of interchangeable lenses. If such a photographic lens is set to infinity, and the camera in accordance with the present invention is focused, there are cases where the photographic lens can be focused only up to a farther distance than the nearest-end distance. In such a case, however, if the range ring of the photographic lens is moved forward in advance by being rotated, AF on the nearest side from that distance becomes possible. If the photographic lens is set to nearest end at maximum, the amount of the body core being driven corresponds to an intermediate ring, and AF photographing of a nearer distance than the nearest end of the lens becomes possible.

In addition, by virtue of the above-described joining arrangement for the outer case 40, it is possible to adopt a plastic molding so as to enhance the degree of freedom in the design of the outer case 40 and lower the cost.

What is claimed is:

1. An autofocus camera capable of performing an autofocus function with a non-autofocus camera lens, the camera comprising:

a fixed section having a lens mount onto which a camera lens is mountable, the camera lens defining an optical axis and an in-focus position on the optical axis, a movable section coupled to the fixed section and movable in the direction of the optical axis with respect to the fixed section, the movable section holding a film onto which an image is to be formed through the camera lens, and means for moving the movable section relative to the fixed section while preventing relative motion between the movable section and the film, to thereby dispose the film at the in-focus position, wherein the movable section comprises a substantially enclosed box having a film cartridge chamber, a spool chamber, a film guide portion for guiding the film from the film cartridge chamber to the spool chamber, and an aperture formed in the film guide portion, the optical axis passing through a substantially central portion of the aperture, wherein the means for moving comprises a slider for linearly translating the enclosed box together with the film in the direction of the optical axis.

2. An autofocus camera capable of performing an autofocus function with a non-autofocus camera lens, the camera comprising:

a fixed section having a lens mount onto which a camera lens is mountable, the camera lens defining an optical axis and an in-focus position on the optical axis, a movable section coupled to the fixed section and movable in the direction of the optical axis with respect to the fixed section, the movable section holding a film onto which an image is to be formed through the camera lens, and means for moving the movable section relative to the fixed section while preventing relative motion between the movable section and the film, to thereby dispose the film at the in-focus position, wherein the means for moving comprises:

a range finding module for detecting an amount of offset of the film held by the movable section from the in-focus position, and a slider for linearly translating the movable section 20 the detected amount in the direction of the optical-axis.

3. An autofocus camera capable of performing an autofocus function with a non-autofocus camera lens, the camera comprising:

a fixed section having a lens mount onto which a camera lens is adapted to be mounted, the camera lens mounted on the lens mount defining an optical axis, a movable section coupled to the fixed section and movable in a direction of the optical axis with respect to the fixed section, the movable section holding a film cartridge, and positioning a film from the cartridge so that the optical axis passes through the film, a range finding module for detecting an in-focus position for the film, and a slider for linearly translating the movable section together with both the film cartridge and the film in the direction of the optical axis so that the film is located at the in-focus position.

4. The camera of claim 3, wherein the movable section is enclosed by the fixed section.

5. An autofocus camera capable of performing an autofocus function with a non-autofocus camera lens, the camera comprising:

a fixed section having a lens mount onto which a camera lens is adapted to be mounted, the camera lens mounted on the lens mount defining an optical axis, a movable section coupled to the fixed section and movable in a direction of the optical axis with respect to the fixed section, the movable section holding a film cartridge, and positioning a film from the cartridge so that the optical axis passes through the film, a range finding module for detecting an in-focus position for the film, and a slider for linearly translating the movable section together with both the film cartridge and the film in the direction of the optical axis so that the film is located at the in-focus position, wherein the movable section comprises a focal plane shutter, a viewfinder and a mirror box having an optical system for the viewfinder and the range finding module.

6. The camera of claim 5, wherein the range finding module is fixedly arranged with respect to the movable section.

7. A back-driven-type autofocus camera comprising:

a body core including a film feeding and holding device, focal plane shutter, a range finding module and a first optical system for the range finding module, and an outer casing incorporating therein the body core, the outer casing including a lens mount, a release bottom and a slider device for linearly driving the body core in a direction of an optical axis of a lens mounted on the lens mount.

8. The camera of claim 7, wherein the body core comprises a viewfinder and a second optical system for the viewfinder.

* * * * *